(12) United States Patent
Cheng (10) Patent No.: US 12,395,449 B2
(45) Date of Patent: Aug. 19, 2025

(54) PACKET TRANSMISSION METHOD AND APPARATUS

(71) Applicant: New H3C Technologies Co., Ltd., Hangzhou (CN)

(72) Inventor: Zuopin Cheng, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 8 days.

(21) Appl. No.: 18/557,364

(22) PCT Filed: Jul. 15, 2021

(86) PCT No.: PCT/CN2021/106623
§ 371 (c)(1),
(2) Date: Oct. 26, 2023

(87) PCT Pub. No.: WO2023/283902
PCT Pub. Date: Jan. 19, 2023

(65) Prior Publication Data
US 2024/0214323 A1   Jun. 27, 2024

(51) Int. Cl.
*H04L 47/31* (2022.01)
*H04L 47/2483* (2022.01)
(Continued)

(52) U.S. Cl.
CPC ........ *H04L 47/562* (2013.01); *H04L 47/2483* (2013.01); *H04L 47/32* (2013.01);
(Continued)

(58) Field of Classification Search
CPC . H04L 47/562; H04L 47/2483; H04L 47/621; H04L 43/0829; H04L 43/0864;
(Continued)

(56) References Cited

U.S. PATENT DOCUMENTS 6,934,250 B1 * 8/2005 Kejriwal ............ H04Q 3/0091
709/236
12,047,300 B2 * 7/2024 Chen .................... H04L 47/283
(Continued)

FOREIGN PATENT DOCUMENTS

CN       106301973       7/2019
CN       110166367       8/2019
(Continued)

OTHER PUBLICATIONS

International Search Report and Written Opinion issued in counterpart International Application No. PCT/CN2021/106623, mailed Apr. 13, 2022.
(Continued)

*Primary Examiner* — Ario Etienne
*Assistant Examiner* — Elizabeth Kassa
(74) *Attorney, Agent, or Firm* — NORTON ROSE FULBRIGHT US LLP (57) ABSTRACT

The examples of the present disclosure provide a packet transmission method and apparatus, which relates to the field of network technology and is applied to the first network device. The method comprises: receiving a packet sent by a second network device; forwarding, after buffering the received packet for a preset time duration, the received packet. The disclosure of the technical solutions provided by the examples of the present disclosure improves the adaptability of the deterministic transmission to the WAN.

17 Claims, 6 Drawing Sheets

(51) Int. Cl.
*H04L 47/32* (2022.01)
*H04L 47/56* (2022.01)
*H04L 67/125* (2022.01)
*H04L 67/568* (2022.01)
H04L 43/0829 (2022.01)
H04L 43/0864 (2022.01)
H04L 43/087 (2022.01)
H04L 43/106 (2022.01)

(52) U.S. Cl.
CPC ...... *H04L 43/0829* (2013.01); *H04L 43/0864* (2013.01); *H04L 43/087* (2013.01); *H04L 43/106* (2013.01)

(58) Field of Classification Search
CPC ..... H04L 43/087; H04L 43/106; H04L 47/31; H04L 67/125; H04L 47/32; H04L 67/568; H04L 47/24; H04L 47/28; H04L 47/34; H04L 67/565
USPC .......................................................... 709/238
See application file for complete search history.

(56) References Cited

U.S. PATENT DOCUMENTS

| | | | | |
|---|---|---|---|---|
| 2005/0220097 | A1* | 10/2005 | Swami | H04L 47/193 370/389 |
| 2006/0104279 | A1* | 5/2006 | Fellman | H04L 12/2854 370/473 |
| 2017/0195238 | A1* | 7/2017 | Luo | H04L 47/2441 |
| 2017/0366445 | A1* | 12/2017 | Nemirovsky | H04L 45/12 |
| 2020/0259755 | A1* | 8/2020 | Wang | H04L 47/283 |
| 2021/0135978 | A1* | 5/2021 | Nemirovsky | H04L 45/12 |
| 2021/0306246 | A1* | 9/2021 | Jacob da Silva | H04L 41/0816 |
| 2022/0224653 | A1* | 7/2022 | Chen | H04L 47/56 |
| 2022/0239600 | A1* | 7/2022 | Varga | H04L 47/2416 |

FOREIGN PATENT DOCUMENTS

| | | |
|---|---|---|
| CN | 112202685 | 1/2021 |
| CN | 112866127 | 5/2021 |
| CN | 113037640 | 6/2021 |
| JP | 2004088390 | 3/2004 |
| JP | 2015115704 | 6/2015 |
| JP | 2017038226 | 2/2017 |
| WO | WO 2008126179 | 10/2008 |
| WO | WO 2017028545 | 2/2017 |
| WO | WO 2020/239313 | 12/2020 |

OTHER PUBLICATIONS

Extended European Search Report issued in corresponding European Application No. 21949688.2, dated Apr. 30, 2024.

Silva, Luís et al. "On the adequacy of SDN and TSN for Industry 4.0." *2019 IEEE 22nd International Symposium on Real-Time Distributed Computing (ISORC)*, May 7, 2019, pp. 43-51.

* cited by examiner

PACKET TRANSMISSION METHOD AND APPARATUS

CROSS REFERENCE TO RELATED APPLICATIONS

The present application is a national phase application under 35 U.S.C. § 371 of International Application No. PCT/CN2021/106623, filed Jul. 15, 2021, which is incorporated herein by reference in its entirety.

TECHNICAL FIELD

The present disclosure relates to the field of network technology, in particular to a packet transmission method and apparatus.

BACKGROUND

In network disclosure scenarios such as "smart grid", "telemedicine", "audio-visual entertainment" and "industrial remote control", deterministic transmission packets are needed to realize definite time delay and jitter. However, the current deterministic transmission requires higher device on the packet transmission path. Therefore, the current deterministic transmission has poor adaptability to a complex wide area network (WAN).

SUMMARY

The purpose of the examples of the present disclosure is to provide a packet transmission method and apparatus to improve the adaptability of deterministic transmission to WAN. Specifically, the technical solutions are as follows:

In a first aspect, an example of the present disclosure provides a packet transmission method applied to a first network device. The method includes:
  receiving a packet sent by a second network device;
  forwarding, after buffering the received packet for a preset time duration, the received packet.
In an example, the method further includes:
  reorganizing received packets such that, after reorganization, packets belonging to a same flow are arranged in order.
In an example, the reorganizing the received packets includes:
  reorganizing, according to a first mapping rule, the received packets.
In an example, the first mapping rule includes a scheduling queue; the scheduling queue is to buffer packets belonging to a same flow.
In an example, the first mapping rule includes a scheduling cycle; the scheduling cycle is to indicate a time period for packet forwarding;
  the forwarding, after buffering the received packet for a preset time duration, the received packet includes:
  forwarding, after the scheduling cycle of the received packet expires and after buffering the received packet for a preset time duration, the received packet.
In an example, for a same flow, a time difference between a scheduling cycle of the first network device and a scheduling cycle of the second network device is greater than or equal to a target time delay, and the target time delay is a time delay between the first network device and the second network device.
In an example, the first mapping rule includes the preset time duration.

In an example, the first mapping rule is carried in a header of the packet.
In an example, a quintuple is carried in a header of the packet, and the quintuple is to determine a flow to which the packet belongs; or,
  a target flow identity is carried in the header of the packet, and the flow identity is to determine a flow to which the target packet belongs.
In an example, the first network device and the second network device have a same scheduling frequency, and the scheduling frequency is a frequency with which scheduling cycles are divided.
In an example, the method further includes:
  receiving a telemetry packet sent by a second network device; the telemetry packet is to detect quality of service of each path between the second network device and the first network device;
  sending the telemetry packet to a controller.
In an example, the quality of service includes time delay and jitter;
  a tail of the telemetry packet carries timestamp of each network device in the path.
In a second aspect, an example of the present disclosure provides a packet transmission method, which is applied to a controller. The method includes:
  sending a first mapping rule to a first network device; the first mapping rule is to indicate the first network device to buffer a packet sent by a second network device for a preset time duration, and then forward the received packet.
In an example, the method further includes:
  sending a second mapping rule to a second network;
  the first mapping rule and the second mapping rule include a scheduling cycle; the scheduling cycle is to indicate a time period for packet forwarding;
  for a same flow, a time difference between a scheduling cycle of the first network device and a scheduling cycle of the second network device is greater than or equal to a target time delay, and the target time delay is a time delay between the first network device and the second network device.
In an example, the method further includes:
  receiving a telemetry packet sent by the first network device; the telemetry packet is to detect quality of service of each path between the second network device and the first network device;
  determining, according to information carried in the telemetry packet, the quality of service of each path.
In an example, the quality of service includes time delay and jitter; the tail of the telemetry packet carries the timestamp of each network device of the path.
In an example, before sending the first mapping rule to the first network device, the method further includes:
  receiving a request packet sent by a second network device; the request packet is to request a mapping rule for transmission packets between the second network device and the first network device;
  determining the first mapping rule according to the request packet.
In an example, the request packet carries target transmission parameters;
  the determining the first mapping rule according to the request packet includes:
  determining, according to the quality of service of each path between the first network device and the second network device, a path whose quality of service meets the target transmission parameters and the first mapping rule.

In a third aspect, an example of the present disclosure provides a packet transmission apparatus applied to a first network device. The apparatus includes:
- a first receiving unit, to receive a packet sent by a second network device;
- a forwarding unit, to forward, after buffering the received packet for a preset time duration, the received packet.

In a fourth aspect, an example of the present disclosure provides a packet transmission apparatus, which is applied to a controller. The apparatus includes:
- a first sending unit, to send a first mapping rule to a first network device; the first mapping rule is to indicate the first network device to buffer a packet sent by a second network device for a preset time duration, and then forward the received packet.

In a fifth aspect, an example of the present disclosure provides a network device, including a processor and a machine-readable storage medium, where the machine-readable storage medium stores machine-executable instructions that can be executed by the processor, and the processor is caused by the machine executable instructions to implement any of the packet transmission methods provided in the first aspect.

In a sixth aspect, an example of the present disclosure provides a controller, including a processor and a machine-readable storage medium, where the machine-readable storage medium stores machine-executable instructions that can be executed by the processor, and the processor is caused by the machine executable instructions to implement any of the packet transmission methods provided in the second aspect.

In a seventh aspect, an example of the present disclosure provides a computer-readable storage medium having computer programs stored thereon which, when executed by a processor, cause the processor to implement any of the packet transmission methods provided in the first aspect or the second aspect.

In an eighth aspect, an example of the present disclosure also provide a computer program that, when running on a computer, causes the computer to implement any of the packet transmission methods provided in the first aspect or the second aspect.

The examples of the present disclosure have the following beneficial effects:

In the technical solution provided by the examples of the present disclosure, the first network device buffers the received packet for a preset time duration, within the preset time duration, the first network device may receive other packets that belong to the same flow as the received packet. In this way, when the received packet is buffered for a preset time duration, when the first network device forwards the received packet, the jitter caused by the packet forwarding of the same flow may be reduced, and deterministic transmission may be realized. It may be seen that, in the technical solution provided by the examples of the present disclosure, the deterministic transmission may be realized by buffering the packet by the network device on a receiving packet side. The deterministic transmission method has no requirements for other network devices on the transmission path. This enables the technical solution provided by the examples of the present disclosure to better adapt to complex WAN, and improves the adaptability of the deterministic transmission to the WAN.

It should be understood that any product or method for implementing the examples of the present disclosure does not necessarily require all of the advantages described above.

BRIEF DESCRIPTION OF THE DRAWINGS

In order to more clearly describe the technical solution of the examples of the disclosure or of the prior art, drawings needed in the examples and the prior art will be briefly described below. Obviously, the drawings described below are for only some examples of the present disclosure, one of ordinary skills in the art may also obtain other examples based on these drawings.

DETAILED DESCRIPTION

The technical solution of the disclosure will be described in detail with reference to the drawings of examples of the present disclosure. Obviously, the examples described are only some instead of all of the examples of the present disclosure. All other examples obtained by those of ordinary skills in the art based on the present disclosure are within the scope of the present disclosure.

The words appearing in the example of the present disclosure are explained below.

Time sensitive network (TSN): a group of Ethernet standards, which realize the low time delay flow service of time synchronization through core technologies such as accurate time synchronization and timing scheduling, and provide low time delay isochronous standard data for each unit in the system, so as to provide a basis for the integration of control, measurement, configuration, user interface (UI) and file exchange infrastructure, etc.

Time slot: time is divided into time slots by equal division, which is the smallest scheduling unit in TSN.

Deterministic network: refers to the network that ensures the deterministic bandwidth, time delay, jitter and packet loss rate of services; deterministic network technology is a new quality of service (QOS) guarantee technology.

In network disclosure scenarios such as "smart grid", "telemedicine", "audio-visual entertainment" and "industrial remote control", deterministic transmission packets are needed to realize definite time delay and jitter. At this time, these networks may be called deterministic networks.

The demand for deterministic networks mainly comes from two aspects:

1. Compatible with Ethernet standards: In traditional scenarios such as industrial automation and intelligent manufacturing, it is necessary to replace dozens of fieldbus and real-time Ethernet standards with Ethernet, and integrate Information Technology (IT) network and operational technology (OT) network, to achieve shared network transmission of best-effort flow and industrial time delay-sensitive flow, reducing costs.
2. Carrying deterministic services: with the surge in communication traffic between machines, it is necessary to build a super high-speed railway in the network in combination with technologies such as 5th Generation Mobile Communication Technology (5G) in emerging network disclosure scenarios such as autonomous driving, remote surgery, and holographic communication, so as to realize end-to-end transmission of deterministic services, referred to as deterministic transmission.

Traditional Internet and industrial networks mainly use the following four methods to ensure QoS:

a) Expansion/light load: expansion means expanding the bandwidth to keep the network in a light load state. Now Ethernet has been able to achieve a single-port bandwidth of 400 Gbps.
b) Traffic shaping: through technologies such as token bucket and credit shaping, the rate of specific ports or traffic is limited. For example, the bandwidth of an egress port of an upstream node is 8 Gbps, and a free bandwidth of a downstream node is only 2 Gbps. This requires limiting the transmission bandwidth of the upstream node to less than 2 Gbps to avoid congestion in the downstream node.
c) Queue scheduling: refers to scheduling traffic on the egress port of a switch. First, the packets are marked with different priorities, then the packets are added to the corresponding priority queues, and finally, different queue scheduling algorithms, such as Strict Priority (SP) algorithm and Weighted Round Robin (WRR) algorithm, etc., are used to process the packets.

Wherein, the SP algorithm is scheduled strictly according to the order of the priority of the queue. Only after all the packets in a high-priority queue are scheduled, a low-priority queue may be scheduled.

The WRR algorithm will give each queue a weight, and forward it in turn according to a ratio of the weight, so as to avoid low-priority traffic waiting for a long time.

d) Congestion control: when the traffic is too much and a buffer space of a buffer queue is insufficient, congestion and packet loss will occur in the network, which requires congestion control. Currently, congestion may be detected by using the congestion control methods, such as explicit congestion notification (ECN) or data center transmission control protocol (DCTCP) based on explicit congestion marking or Timely, Swift, etc. based on round-trip time delay (RTT), so that the upstream nodes until a sending end reduce the rate of sending packets.

The above technical solution for guaranteeing QoS has the following problems:

1) Lack of bounded time delay jitter guarantee: because it is to count and reuse the bandwidth resources of the egress port, and lack the QoS guarantee mechanism of time delay dimension, there will always be queuing and congestion in best-effort forwarding, and the service time delay is in the order of 50 ms-1 s, and there is a long tail time delay.
2) Difficult to deal with multicast and burst traffic: because the traffic size at the sending end and the time of sending packets are uncontrollable, there are multiple data streams in the network that converge (that is, multicast) at downstream nodes, and the traffic surges at a certain moment (that is, traffic burst), resulting in congestion and packet loss in the network.

In order to solve the above two problems, the concept of time division multiplexing (TDM) is introduced in related technologies, such as TNS, to achieve clock synchronization and time slot planning. In short, the entire network is scheduled to forward packets according to a unified beat, so as to achieve a certain time delay and jitter.

(1) Clock synchronization: that is, clocks of the entire network are synchronized, the clocks of the terminal and the switch are the same, and the network card should also stamp the packet with a hard timestamp.

There are currently two clock synchronization methods: one is a master-slave mode, where the most accurate clock is selected as a master clock, and the other slave clocks are synchronized with the master clock; the other is a voting mode, for example, there are 9 devices in a domain, the current clock of 5 devices is 1:00 and the clock of 4 devices is 1:01. According to the principle that the minority obeys the majority, all 9 devices are adjusted to 1:00.

(2) Time slot planning: time slot generally refers to the transmission resources of time dimension of the egress port of the switch.

For example, if the bandwidth of the egress port of a switch is 1 Gbps, and one packet has 1500 bytes, that is, 12000 bits, the transmission of this packet will occupy a certain period of 12 microseconds (μs) time slot resources of the egress port, and which section of time slot resource occupied is determined by the start time of the transmission of the packet.

Since most of the industrial traffic involves periodically sent packets smaller than the maximum transmission unit (MTU), the start time of sending packets by the terminal may be controlled, so that each packet is "triggered" to be sent only at the time calculated in advance through a global time slot planning (that is, time division multiplexing), to ensure that the time slots occupied by the egress port of each hop do not conflict with each other, thereby avoiding the occurrence of multicast and burst traffic, and achieving "on time and accurate" transmission.

The above-mentioned deterministic transmission based on TSN has the following disadvantages:

1. The network span is small: the above-mentioned deterministic transmission based on TSN is only suitable for layer-2 network forwarding, and the deterministic network is equivalent to a small-scale local area network.
2. Strict requirements for network device: under clock synchronization, the same frequency and time must be maintained between network devices.
3. The network device along the way must support TSN, if one of the network devices does not support TSN, it will not be able to achieve the effect of end-to-end deterministic transmission.

In order to solve the above-mentioned problems, the related technology also introduces a cyclic specific queuing and forwarding (CSQF) mechanism based on segment routing.

The controller assigns a segmented identification (SID) to each network device, and specifies the egress port and forwarding cycle corresponding to the SID. The network device parses a packet header to obtain the SID carried in the packet, and then determines the specific egress port and forwarding cycle, and forwards the packet through the determined egress port according to the determined forwarding cycle.

The above-mentioned packet transmission method based on the CSQF mechanism may solve the small network span, but it still has the following disadvantages: network devices along the way must support the CSQF mechanism.

The actual network is very complicated, a source terminal and a destination terminal span across a WAN. There are many network devices between the source terminal and the destination terminal, and it is difficult for these network devices to support the CSQF mechanism. This makes deterministic transmission less adaptable to WAN in related technologies.

Figure 1:
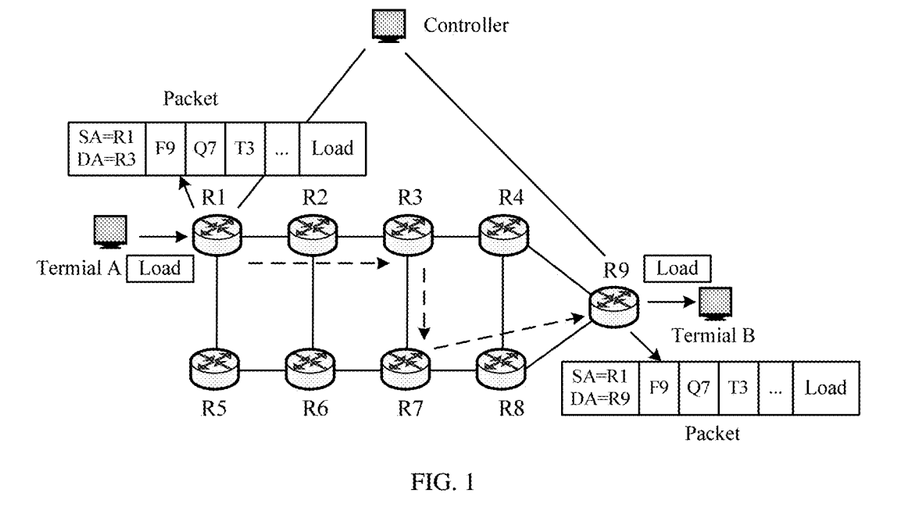
FIG. 1 is a schematic diagram of a WAN according to an example of the present disclosure.

In order to improve the adaptability of deterministic transmission to WAN, an example of the present disclosure provides a packet transmission method, which may be applied to the WAN as shown in FIG. 1. The WAN includes a controller and network devices R1-R9, only 9 network devices are used as an example for description in FIG. 1, which is not limited.

Wherein, the network device may be a router or a switch. The controller may be a software defined network (SDN) controller, or a collector, etc., which is not limited. The controller is to manage the network device of the entire WAN, performing path planning of deterministic transmission, and performing bandwidth reservation of deterministic transmission.

In the WAN shown in FIG. 1, the terminal A is connected to the network device R1, and the terminal B is connected to the network device R9, and the terminal A and the terminal B need to span across the WAN. When the terminal A needs to perform end-to-end deterministic transmission with the terminal B, the terminal A is a source terminal, the terminal B is a destination terminal, the network device R1 connected to the terminal A and the network device R9 connected to the terminal B may be understood as gateway devices, the network device R1 and the network device R9 are key nodes for end-to-end deterministic transmission, and the network device R1 and the network device R9 have the same frequency for scheduling and forwarding.

Figure 2:
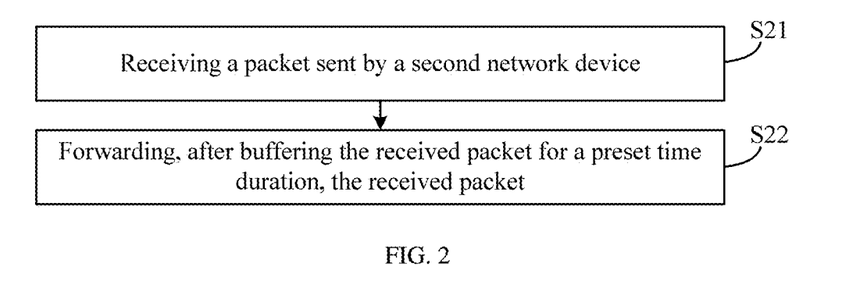
FIG. 2 is a first flow diagram of a packet transmission method according to an example of the present disclosure.

Based on the WAN shown in FIG. 1, an example of the present disclosure provides a packet transmission method. As shown in FIG. 2, the method is applied to a first network device. Wherein, the first network device may be any network device in the WAN. The above-mentioned packet transmission method includes the following blocks:

block S21, receiving a packet sent by a second network device;

block S22, forwarding, after buffering the received packet for a preset time duration, the received packet.

In the technical solution provided by the examples of the present disclosure, the first network device buffers the received packet for a preset time duration, during the preset time duration, the first network device may receive other packets that belong to the same flow as the received packet. In this way, when the received packet is buffered for a preset time duration, when the first network device forwards the received packet, the jitter caused by the packet forwarding of the same flow may be reduced, and deterministic transmission may be realized. It may be seen that, in the technical solution provided by the examples of the present disclosure, the deterministic transmission may be realized by buffering the packet by the network device on a receiving packet side. The deterministic transmission method has no requirements for other network devices on the transmission path. This enables the technical solution provided by the examples of the present disclosure to better adapt to complex WAN, and improves the adaptability of the deterministic transmission to WAN.

In the above block S21, the second network device may be any network device in the WAN. The second network device sends a packet to another network device. The packet may be sent by a terminal to the second network device, or may be generated by the second network device itself.

In the above block S22, after receiving the packet, the first network device buffers the received packet, and after buffering the received packet for a preset time duration, the first network device forwards the received packet.

Wherein, the preset time duration may be set according to actual needs. For example, the preset time duration may be 10 microseconds (μs), 20 μs, 30 μs, etc.

Figure 3:
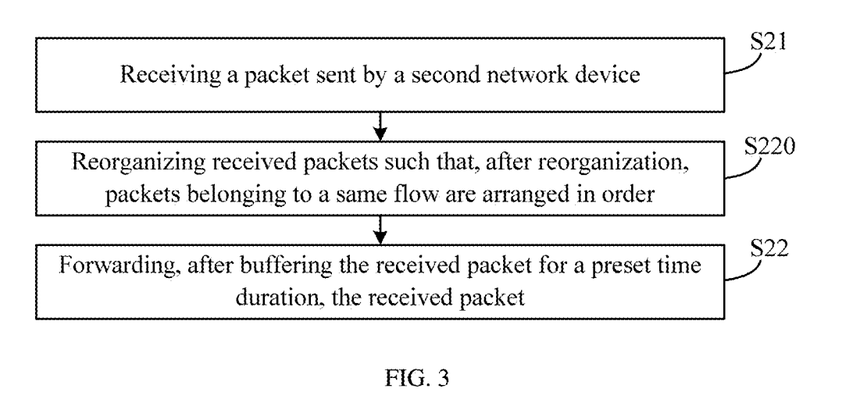
FIG. 3 is a second flow diagram of a packet transmission method according to an example of the present disclosure.

In an example of the present disclosure, in order to reduce the jitter of packet forwarding of the same flow, an example of the present disclosure further provides a packet transmission method, as shown in FIG. 3, the method may further include block S220.

Block S220, reorganizing received packets such that, after reorganization, packets belonging to a same flow are arranged in order.

In the example of the present disclosure, the flow may be a data flow or a control flow.

In an example, in order to distinguish different streams, a quintuple may be carried in a header of the packet, and the quintuple is to determine a flow to which the packet belongs.

In another example, in order to more accurately distinguish different flows, a flow identity may be carried in a header of the packet, and the flow identity is to determine a flow to which the packet belongs.

The first network device receives the packets, recognizes the received packets; arranges, after reorganization, the packets belonging to a same flow in order, that is, out-of-order recovery is realized.

Figure 4:
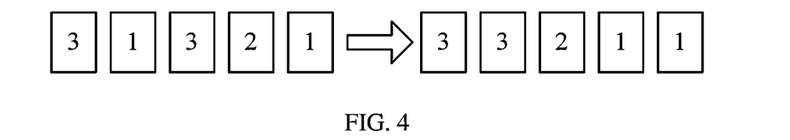
FIG. 4 is a schematic diagram of received packets according to an example of the present disclosure.

For example, a schematic diagram of the received packets as shown in FIG. 4. In FIG. 4, rectangular boxes represent packets, and packets with the same number are the packets of the same flow. For the packets of the same flow, the first network device does not receive the packets sequentially. As shown on the left side of FIG. 4, the first network device first receives one packet of flow 1, and then after it receives one packet of flow 2 and one packet of flow 3, one packet of flow 1 is then received. The first network device reorganizes the received packets, so that the packets of the same flow are arranged in order, as shown on the right side of FIG. 4.

Since multiple streams of packets may be transmitted between different network devices, the order in which the network device receives different streams of packets is not fixed. The first network device receives the packets, recognizes the received packets; arranges, after reorganization, the packets belonging to a same flow in order, which may further reduce jitter of packet forwarding of the same flow.

In one example of the present disclosure, the first network device may pre-store a first mapping rule, and reorganizing the received packets according to the first mapping rule.

For example, after receiving the packets, the first network device determines the first mapping rule corresponding to the flow to which the received packets belong, and then reorganizes the received packets according to the first mapping rule.

In an example, the first mapping rule may include a scheduling queue; the scheduling queue is to buffer packets belonging to a same flow.

In this case, the first network device may buffer the packets of the same flow to a same scheduling queue, thereby realizing out-of-order recovery.

In an example, the first mapping rule may include a scheduling cycle; the scheduling cycle is to indicate a time period for packet forwarding.

In this case, the above block S22 may be: forwarding, after the scheduling cycle of the received packet expires and after buffering the received packet for a preset time duration, the received packet.

For example, the preset time duration is 1 scheduling cycle, the scheduling cycle of the packet is Xth scheduling cycle, and the packet is forwarded in Xth to X+1th scheduling cycle.

By setting the scheduling cycle, the packet forwarding is controlled periodically, which facilitates the synchronization of packets and reduces jitter of packet transmission.

In the example of the present disclosure, for the same flow, the time difference between the scheduling cycle of the first network device and the scheduling cycle of the second network device may be greater than or equal to a target time delay, and the target time delay is a time delay between the first network device and the second network device. This may ensure that the first network device may process the packet faster after receiving the packet from the second network device, and reduce the time delay between the first network device and the second network device.

In one example, in order to facilitate control of the received packet and reduce jitter, the first mapping rule may include the preset time duration.

In order to further facilitate the control of the received packet and reduce jitter, the first mapping rule may be carried in the header of the packet sent by the second network device to the first network device.

In an example, the first network device and the second network device have the same scheduling frequency, and scheduling frequency is a frequency with which scheduling cycles are divided. In this way, end-to-end jitter may be further ensured.

Figure 5:
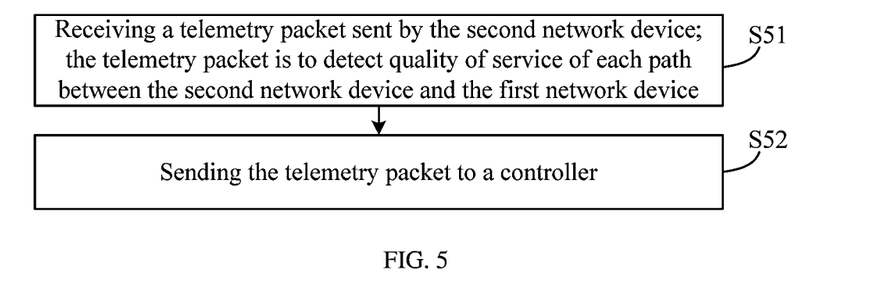
FIG. 5 is a third flow diagram of a packet transmission method according to an example of the present disclosure.

In an example of the present disclosure, a packet transmission method is also provided. As shown in FIG. 5, the method may include the following blocks.

Block S51, receiving a telemetry packet sent by the second network device; the telemetry packet is to detect quality of service of each path between the second network device and the first network device.

Wherein, the quality of service may include but is not limited to time delay and jitter. The telemetry packet may be an in-band network telemetry (INT) packet. A tail of the telemetry packet carries timestamp of each network device along the path.

Block S52, sending the telemetry packet to a controller.

Through the example of the present disclosure, it is convenient for the controller to determine the maximum time delay of each path, specific encapsulation and processing operations, etc., to ensure that the deterministic transmission service is effective within QoS constraints.

Figure 6:
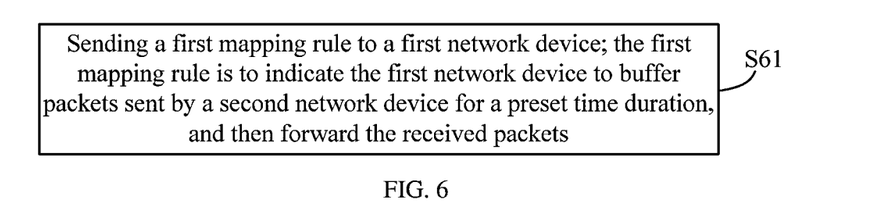
FIG. 6 is a fourth flow diagram of a packet transmission method according to an example of the present disclosure.

Based on the above-mentioned packet transmission method applied to the first network device, an example of the present disclosure also provides a packet transmission method. As shown in FIG. 6, the method is applied to a controller and includes the following blocks:

block S61, sending a first mapping rule to a first network device; the first mapping rule is to indicate the first network device to buffer the received packet sent by the second network device for a preset time duration, and then forward the received packet.

The controller may monitor the WAN. In one example, when it is determined that the mapping rule on the first network device may not meet the packet transmission demands between the first network device and the second network device, the controller may determine a new mapping rule, that is, the first mapping rule, the first mapping rule is sent to the first network device.

Figure 7:
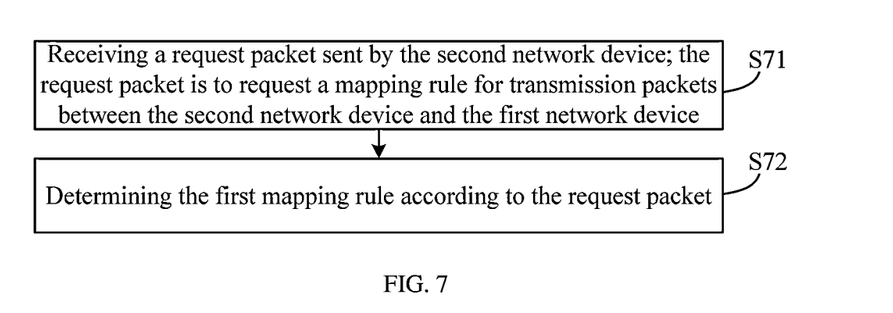
FIG. 7 is a fifth flow diagram of a packet transmission method according to an example of the present disclosure.

In another example, the controller may determine the first mapping rule in the following manners, as shown in FIG. 7:

block S71, receiving a request packet sent by the second network device; the request packet is to request a mapping rule for transmission packets between the second network device and the first network device;

block S72: determining the first mapping rule according to the request packet.

In the example of the present disclosure, when the controller receives the request packet sent by the second network device, it determines the first mapping rule, and then executes block S61 to send the first mapping rule to the first network device, so as to realize deterministic transmission between the second network and the first network device.

The controller may issue mapping rules according to implementation requirements by using the example of the present disclosure, which saves network resources.

In an example, the above request packet carries target transmission parameters; according to the quality of service of each path between the first network device and the second network device, the path whose quality of service meets the target transmission parameters and the first mapping rule are determined. After that, the second network device forwards the packet to the first network device along the determined path according to the first mapping rule, which may realize deterministic transmission of user requirements.

Wherein, the target transmission parameters may be a bandwidth required for the packet transmission and time delay of the packet transmission, etc.

Figure 8:
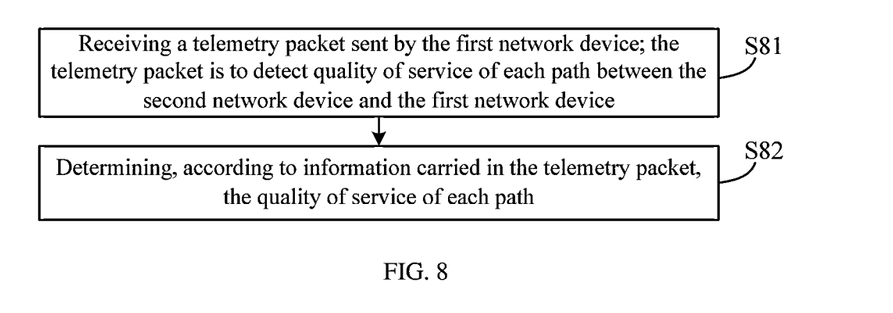
FIG. 8 is a sixth flow diagram of a packet transmission method according to an example of the present disclosure.

In one example of the present disclosure, a packet transmission method is also provided. As shown in FIG. 8, the method may include the following blocks:

block S81, receiving a telemetry packet sent by the first network device; the telemetry packet is to detect quality of service of each path between the second network device and the first network device;

block S82, determining, according to information carried in the telemetry packet, the quality of service of each path.

Through the example of the present disclosure, the controller may determine the maximum time delay of each path, specific encapsulation and processing operations, etc., to ensure that the deterministic transmission service is effective within QoS constraints.

In one example of the present disclosure, the controller may also send the second mapping rule to the second network device. Wherein the first mapping rule and the second mapping rule include a scheduling cycle; the scheduling cycle is to indicate a time period for packet forwarding;

for the same flow, the time difference between the scheduling cycle of the first network device and the scheduling cycle of the second network device is greater than or equal to a target time delay, and the target time delay is a time delay between the first network device and the second network device.

This may ensure that the first network device may process the packet faster after receiving the packet from the second network device, and reduce the time delay between the first network device and the second network device.

The packet transmission method provided in the example of the present disclosure will be described below in conjunction with the WAN shown in FIG. 1. The end-to-end deterministic transmission between terminal A and terminal B may include:

The terminal A sends a packet 1 to the network device R1, and the packet 1 carries a flow identity (FlowID) 9.

After receiving packet 1, the network device R1 determines path 1 corresponding to the flow identity 1 (the path indicated by the network devices R1→R3→R7→R9 in FIG. 1) and mapping rule 1 according to the pre-stored correspondence between the flow identity, path, and mapping rule. In FIG. 1, SA represents source address, DA represents destination address, and the dotted line with an arrow represents the transmission path of the packet. F9, Q7, and T3 in the packet represent mapping rules.

Wherein, the mapping rule is a forwarding rule for indicating the packet. The mapping rules may be set according to actual needs. The mapping rule may include, but is not limited to, information such as scheduling queue, scheduling cycle, and the buffering time corresponding to the flow identity.

For example, the mapping rules include FX1, QX2, and TX3. FX1 is FlowID; QX2 is scheduling queue identity, indicating the X2 queue, that is, the packet carrying FlowID X1 is mapped to the X2 queue; TX3 is the scheduling cycle, indicating the X3 scheduling cycle, that is, the packet carrying FlowID X1 is forwarded in the X3 scheduling cycle. The mapping rule may also include buffering time (that is, the above-mentioned preset time duration), so as to realize the synchronization of the packet and reduce the jitter of the packet transmission. For example, the buffering time is 1 scheduling cycle. At this time, the above-mentioned mapping rule represents that the packet carrying FlowID X1 is mapped to the X2 queue, and the packet buffered in the X2 queue is forwarded in the X3 to X3+1 scheduling cycle.

Suppose that the mapping rule 1 includes F9, Q7, and T3, the buffering time is 1 scheduling cycle, and the path 1 is the path indicated by the network devices R1→R3→R7→R9 in FIG. 1. The network device R1 forwards packet 1 to network device R9 along path 1 according to mapping rule 1, that is, packet 1 carrying FlowID 9 is mapped to the 7th queue, and in the 3-4 scheduling cycle, it forwards the packet 1 buffered in the 7th queue to network device R9.

In one example, the network device R1 may encapsulate the above-mentioned mapping rule 1 in the header of the packet 1, as shown in FIG. 1, so that the network device R9 may accurately forward the packet 1 according to the mapping rule 1, and realize deterministic transmission.

In FIG. 1, only the mapping rules in the header of the packet 1 including F9, Q7, and T3 are taken as an example for illustration, which is not limited. When it is necessary to forward the packet based on SRv6 technology, the header of the packet shown in FIG. 1 may also include information such as the SID of each network device on the path.

Figure 9:
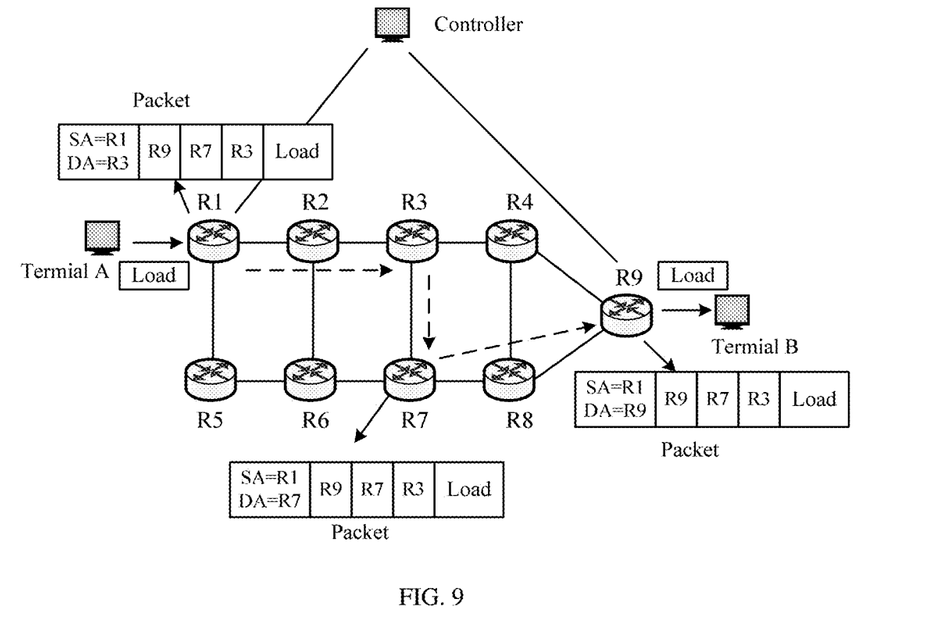
FIG. 9 is another schematic diagram of a WAN according to an example of the present disclosure.

In another example, in order to reduce the pressure of packet transmission, the network device R1 may not encapsulate the above mapping rule 1 in the header of packet 1. WAN is as shown in FIG. 9. SA represents source address, DA represents destination address, the dotted line with an arrow represents the transmission path of the packet. The R9 carried in the packet header represents SID of the network device R9, the R7 carried in the packet header represents the SID of the network device R7, and the R3 carried in the packet header represents SID of the network device R3. The network device R9 determines the corresponding mapping rule 1 according to the correspondence between the locally stored flow identity and the mapping rule. FIG. 9 only uses packet forwarding based on the SRv6 technology as an example to illustrate the forwarding. If other technologies are used for packet forwarding, the SID may not be carried in the packet header.

After receiving the packet 1, the network device R9 buffers the packet 1 for the preset time duration according to the mapping rule 1, and then sends the packet 1 to the terminal B, so as to realize deterministic transmission.

In the above example, only the flow identity carried in the packet is taken as an example for illustration. If the flow identity is not used, different flows may also be distinguished, and the flow identity may not be carried in the packet.

Figure 10:
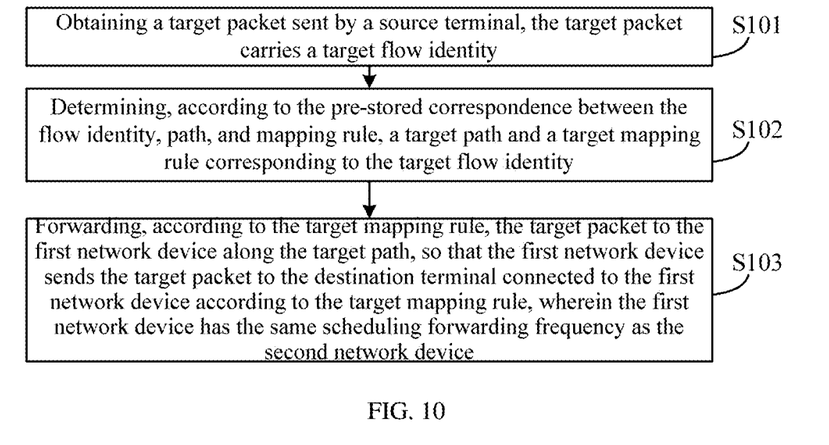
FIG. 10 is a seventh flow diagram of a packet transmission method according to an example of the present disclosure.

As shown in FIG. 10, it shows the seventh flow diagram of the packet transmission method according to the example of the present disclosure, which is applied to the second network device connected to the source terminal, and includes the following blocks:

block S101, obtaining a target packet sent by a source terminal, the target packet carries a target flow identity.

In the example of the present disclosure, the source terminal sends a packet, that is, a target packet, to the second network device. The flow identity carried in the target packet is a target flow identity.

Block S102, determining, according to the pre-stored correspondence between the flow identity, path, and mapping rule, a target path corresponding to the target flow identity and a target mapping rule.

In the example of the present disclosure, the correspondence between the flow identity, path, and mapping rule is pre-stored in the second network device. After obtaining the target packet, the second network device searches for a correspondence including the target flow identity in the pre-stored correspondence between the flow identity, path, and mapping rule; after find the correspondence, the second network device uses the path included in the found correspondence as the target path corresponding to the target flow identity, and uses the mapping rule included in the found correspondence as the target mapping rule.

Block S103: forwarding, according to the target mapping rule, the target packet to the first network device along the target path, so that the first network device sends the target packet to the destination terminal connected to the first network device according to the target mapping rule, wherein the first network device has the same scheduling forwarding frequency as the second network device.

In the example of the present disclosure, the first network device and the second network device have the same packet scheduling forwarding frequency. For example, the first network device and the second network device both support a CSQF mechanism, and the first network device and the second network device are divided into many scheduling cycles according to the same scheduling frequency. In this way, end-to-end network jitter may be ensured, and the time delay may be determined through bandwidth reservation and INT measurement. After obtaining the target path and the target mapping rule, the second network device forwards the target packet to the first network device along the target path according to the target mapping rule.

In one example of the present disclosure, the WAN may determine the path based on segment routing (SR). For example, the controller may use the segment routing Internet Protocol Version 6 (SRv6) technology based on the sixth version of the Internet Protocol to separate set segment identifier (SID) for each network device, and complete end-to-end visibility, path planning, bandwidth reservation, etc. based on the SID of each network device. Each network device uses SID to forward the received packet.

In the example of the present disclosure, in addition to the first network device and the second network device, the target path may also include one or more network devices. After the one or more network devices receive the target packet, they may be directly forward the target packet without determining a specific forwarding cycle of the target packet. After receiving the target packet, the first network device may send the target packet to the target terminal based on the CSQF mechanism and in accordance with the target mapping rule.

In the technical solution provided by the examples of the present disclosure, there are only requirements for the second network device connected to the source terminal and the first network device connected to the destination terminal, that is, the first network device and the second network device should have the same scheduling and forwarding frequency, for example, only the first network device and the second network device need to support the CSQF mechanism, and there is no requirement for other network devices between the first network device and the second network device, and the deterministic delay and jitter may be realized, and deterministic transmission may be realized. This enables the technical solution provided by the examples of the present disclosure to better adapt to complex WAN, and improves the adaptability of the deterministic transmission to the WAN.

Figure 11:
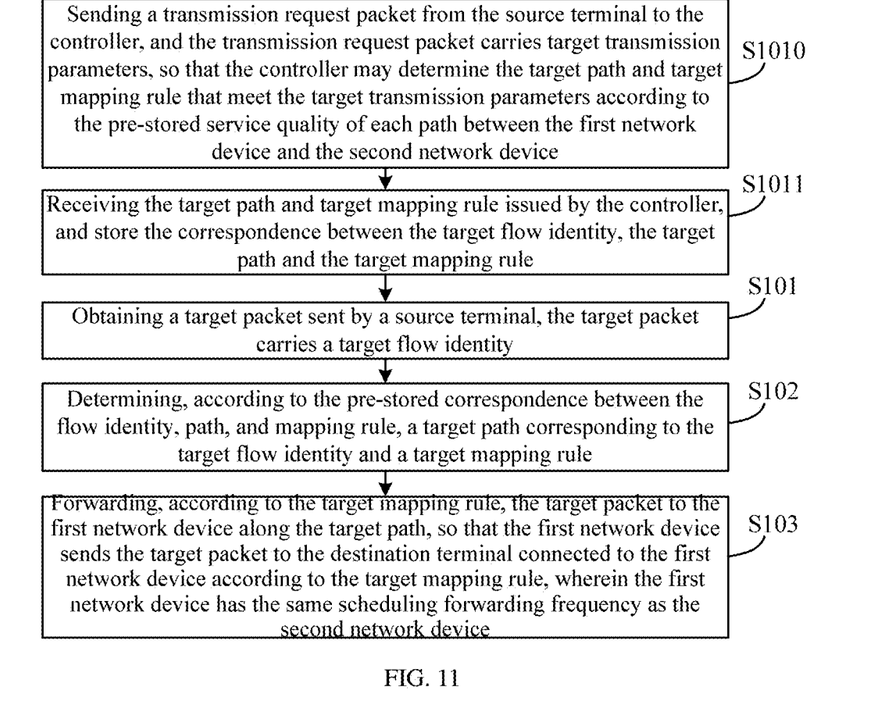
FIG. 11 is an eighth flow diagram of a packet transmission method according to an example of the present disclosure.

In one example of the present disclosure, a packet transmission method is also provided. As shown in FIG. 11, the method may include the following blocks before block S101:

Block S1010: sending a transmission request packet from the source terminal to the controller, and the transmission request packet carries target transmission parameters, so that the controller may determine target path and target mapping rule that meet the target transmission parameters according to the pre-stored service quality of each path between the first network device and the second network device stored.

In the example of the present disclosure, when the source terminal needs to deterministically transmit a packet to the destination terminal, the source terminal sends a transmission request packet to the second network device, and the second network device sends the transmission request packet to the controller. The transmission request packet carries target transmission parameters, and the target transmission parameters may include, but are not limited to: FlowID, bandwidth required for packet transmission, and time delay of packet transmission, etc.

The quality of service of each path between the first network device and the second network device is pre-stored in the controller. Wherein, the quality of service of a path includes the remaining bandwidth of the path, the time delay of the path, and the queue resources of the path.

After receiving the transmission request packet, the controller obtains target transmission parameters from the transmission request packet; determines a target path whose quality of service meets the target transmission parameters according to the pre-stored quality of service of each path between the first network device and the second network device, and determines target mapping rule.

Block S1011, receiving the target path and target mapping rule issued by the controller, and store the correspondence between the target flow identity, the target path and the target mapping rule.

In the example of the present disclosure, after determining the target path and the target mapping rule, the controller issues the target path and the target mapping rule to the second network device. The second network device receives the target path and target mapping rule issued by the controller, and then stores the correspondence between the target flow identity, the target path and the target mapping rule.

After that, the second network device forwards the packet carrying the target flow identity based on the stored correspondence between the target flow identity, the target path, and the target mapping rule.

In the example of the present disclosure, the controller collects the quality of service of multiple paths between the first network device and the second network device, and uniformly plans the paths, thereby realizing deterministic transmission.

In one example of the present disclosure, after determining the target path and the target mapping rule, the controller issues the corresponding target mapping rule to the first network device. In this way, the first network device stores the correspondence between the target flow identity and the target mapping rule, so as to achieve accurate and deterministic transmission. Here, target mapping rule stored by the first network device is different from target mapping rule stored by the second network device by a target time delay. The target time delay is a time delay between the first network device and the second network device.

In one example of the present disclosure, in order to achieve deterministic transmission, the second network device may periodically send the telemetry packet to the first network device along each path between the first network device and the second network device. The telemetry packet is to detect the quality of service of each path between the first network device and the second network device.

The first network device sends the received telemetry packet to the controller. After receiving the telemetry packet sent by the first network device, the controller obtains the quality of service of each path between the first network device and the second network device, and then stores the quality of service of each path between the first network device and the second network device.

In the example of the present disclosure, the telemetry packet may be an in-band network telemetry (INT) packet. When forwarding the INT packet along the path from the first network device to the second network device, the network device along the path inserts device information of the network device in the INT packet, as well as the timestamp of receiving the INT packet and the timestamp by sending the INT packet by network device. Wherein, the timestamp of receiving the INT packet and the timestamp of sending the INT packet by the network device are collectively called the timestamp. The timestamp is located at the end of the INT packet, and device information of the network device may be located in the header of the INT packet.

Figure 12:
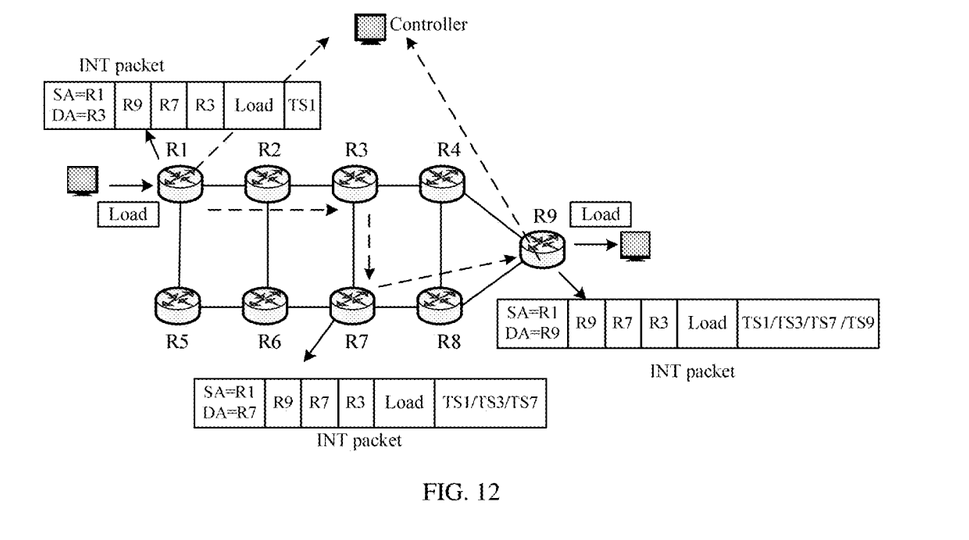
FIG. 12 is a schematic diagram of forwarding of an INT packet according to an example of the present disclosure.

For example, in the forwarding schematic diagram of the INT packet shown in FIG. 12, SA represents the source address, DA represents the destination address, and the dotted line with arrow represents the transmission path of the INT packet. When forwarding the INT packet along the network devices R1→R3→R7→R9, when the network device R1 forwards the INT packet, it inserts the timestamp TS1 at the end of the INT packet, and when the network device R3 forwards the INT packet, it inserts the timestamp TS3 at the end of the INT packet; when the network device R7 forwards the INT packet, it inserts the timestamp TS7 at the end of the INT packet, and when the network device R9 sends the INT packet to the controller, it inserts the timestamp TS9 at the end of the INT packet. FIG. 12 only shows the INT packet forwarded by the network devices R1, R7, and R9.

Here, network devices R1, R3, R7, and R9 support INT, and add a timestamp to the INT packet, and network devices R2 and R8 are also network devices that through the network, but network devices R2 and R8 do not support INT, therefore the timestamp is not added to the INT packet.

After the controller receives the INT packet sent by the network device R9, it analyzes the timestamp carried in the INT packet to determine the time delay and jitter of the path of the network devices R1→R3→R7→R9, and thereby realizing end-to-end QoS detection. It is convenient for the controller to determine the maximum time delay of each path, specific encapsulation and processing operations, etc., to ensure that the deterministic transmission service is effective within QoS constraints.

In the example of the present disclosure, in order to more accurately detect end-to-end QoS, when forwarding the INT packet along the path from the second network device to the first network device, the network device in the path may send an INT packet to the controller while forwarding the network device to a next hop device. When a network device in the path does not send an INT packet to the controller, it is determined that the network device is faulty. Based on this, the controller may issue an alarm in time to prompt the fault of the network device, and then repair the network device in time.

Figure 13:
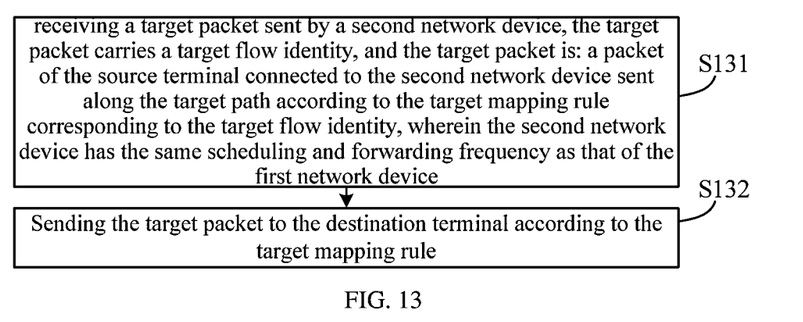
FIG. 13 is a ninth flow diagram of a packet transmission method according to an example of the present disclosure.

Based on the above-mentioned packet transmission method applied to the second network device, an example of the present disclosure also provides a packet transmission method. As shown in FIG. 13, the method is applied to a first network device connected to the destination terminal and includes the following blocks:

block S131: receiving a target packet sent by a second network device, the target packet carries a target flow identity, and the target packet is: a packet of the source terminal connected to the second network device sent along the target path according to the target mapping rule corresponding to the target flow identity, wherein the second network device has the same scheduling and forwarding frequency as that of the first network device.

Block S132, sending the target packet to the destination terminal according to the target mapping rule.

In one example of the present disclosure, if the target packet carries a target mapping rule, the above block S132 may specifically be: sending the target packet to the destination terminal according to the target mapping rule carried in the target packet.

In another example of the present disclosure, if the target packet does not carry the target mapping rule, the above block S132 may specifically be: determining the target mapping rule corresponding to the target flow identity according to the pre-stored correspondence between the flow identity and the mapping rule; sending the target packet to the destination terminal according to the determined target mapping rule.

In one example of the present disclosure, in order to achieve end-to-end deterministic transmission, the first network device receives the target mapping rule issued by the controller, and the target mapping rule is: after receiving the transmission request packet sent by the source terminal, the controller determines mapping rule that satisfies the target transmission parameters carried in the transmission request packet according to the pre-stored quality of service of each path between the second network device and the first network device; stores the correspondence between the target flow identity and the target mapping rule.

In the example of the present disclosure, in order to accurately store the correspondence between the target flow identity and the target mapping rule, the controller issues the target flow identity to the first network device while issuing the target mapping rule to the first network device.

In one example of the present disclosure, the first network device receives a telemetry packet from the second network device, and the telemetry packet is to detect the quality of service of each path between the second network device and the first network device; the telemetry packet is sent to the controller.

Wherein, the telemetry packet may be an INT packet or other type of telemetry packet.

In the technical solution provided by the examples of the present disclosure, there are only requirements for the second network device connected to the source terminal and the first network device connected to the destination terminal, that is, the first network device and the second network device should have the same scheduling and forwarding frequency, for example, only the first network device and the second network device need to support the CSQF mechanism, and there is no requirement for other network devices between the first network device and the second network device, and the deterministic delay and jitter may be realized, and deterministic transmission may be realized. This enables the technical solution provided by the examples of the present disclosure to better adapt to complex WAN, and improves the adaptability of the deterministic transmission to the WAN.

Figure 14:
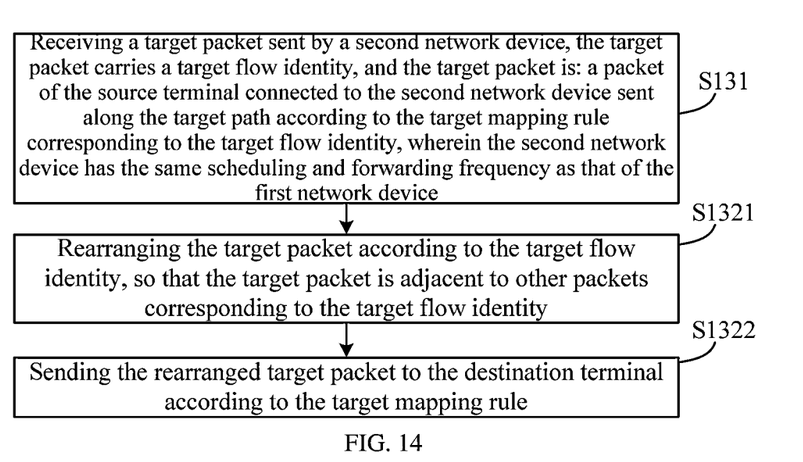
FIG. 14 is a tenth flow diagram of a packet transmission method according to an example of the present disclosure.

In one example of the present disclosure, a packet transmission method is also provided. As shown in FIG. 14, in the method, the block S132 may be refined into blocks S1321 and S14322.

Block S1321: rearranging the target packet according to the target flow identity, so that the target packet is adjacent to other packets corresponding to the target flow identity.

Block S1322, sending the rearranged target packet to the destination terminal according to the target mapping rule.

In the technical solution provided by the examples of the present disclosure, the first network device uses the flow identity to rearrange the packets, that is, reorganize the packets to achieve out-of-order recovery, which ensure that packets belonging to the same data flow are sent in order, and jitter is reduced, thereby realizing end-to-end deterministic transmission.

Figure 15:
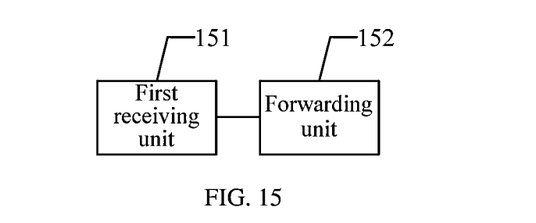
FIG. 15 is a first structural diagram of a packet transmission apparatus according to an example of the present disclosure.

Corresponding to the above-mentioned packet transmission method, an example of the present disclosure also provides a packet transmission apparatus, as shown in FIG. 15, which is applied to a first network device, and the method includes:

a first receiving unit 151, to receive a packet sent by a second network device;

a forwarding unit 152, to forward, after buffering the received packet for a preset time duration, the received packet.

In an example, the apparatus further comprises:

a reorganizing unit, to reorganize received packets;

arrange, after reorganization, packets belonging to a same flow in order.

In an example, the recombination unit is specifically to reorganize, according to a first mapping rule, the received packets.

In an example, the first mapping rule includes a scheduling queue; the scheduling queue is to buffer packets belonging to a same flow.

In an example, the first mapping rule includes a scheduling cycle; the scheduling cycle is to indicate a time period for packet forwarding;

the forwarding unit is specifically to forward, after the scheduling cycle of the received packet expires and after buffering the received packet for a preset time duration, the received packet.

In an example, for the same flow, the time difference between the scheduling cycle of the first network device and the scheduling cycle of the second network device is greater than or equal to a target time delay, and the target time delay is a time delay between the first network device and the second network device.

In an example, the first mapping rule includes the preset time duration.

In an example, the first mapping rule is carried in a header of the packet.

In an example, a quintuple is carried in the header of the packet, and the quintuple is to determine a flow to which the packet belong; or, a target flow identity is carried in the header of the packet, and the flow identity is to determine a flow to which a target packet belong.

In an example, the first network device and the second network device have the same scheduling frequency, and the scheduling frequency is a frequency with which scheduling cycles are divided.

In an example, the apparatus further comprises:

a second receiving unit, to receive a telemetry packet sent by the second network device; the telemetry packet is to detect quality of service of each path between the second network device and the first network device;

sending the telemetry packet to a controller.

In an example, the quality of service includes time delay and jitter;

a tail of the telemetry packet carries timestamp of each network device in the path.

In the technical solution provided by the examples of the present disclosure, the first network device buffers the received packet for the preset time duration, within the preset time duration, the first network device may receive other packets that belong to the same flow as the received packet. In this way, when the received packet is buffered for a preset time duration, when the first network device forwards the received packet, the jitter caused by the packet forwarding of the same flow may be reduced, and deterministic transmission may be realized. It may be seen that, in the technical solution provided by the examples of the present disclosure, the deterministic transmission may be realized by buffering the packet by the network device on a receiving packet side. The deterministic transmission method has no requirements for other network devices on the transmission path. This enables the technical solution provided by the examples of the present disclosure to better adapt to complex WAN, and improves the adaptability of the deterministic transmission to the WAN.

Figure 16:
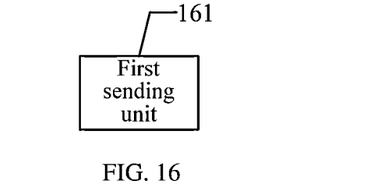
FIG. 16 is a second structural diagram of a packet transmission apparatus according to an example of the present disclosure.

Corresponding to the above-mentioned packet transmission method, an example of the present disclosure also provides a packet transmission apparatus, as shown in FIG. 16, which is applied to a controller, and the apparatus includes:

a first sending unit 161, to send a first mapping rule to a first network device; the first mapping rule is to indicate the first network device to buffer the received packet sent by a second network device for a preset time duration, and then forward the received packet.

In an example, the apparatus further comprises:

a second sending unit, to send a second mapping rule to the second network device;

the first mapping rule and the second mapping rule include a scheduling cycle; the scheduling cycle is to indicate a time period for packet forwarding;

for the same flow, the time difference between the scheduling cycle of the first network device and the scheduling cycle of the second network device is greater than or equal to a target time delay, and the target time delay is a time delay between the first network device and the second network device.

In an example, the apparatus further comprises:

a first receiving unit, to receive a telemetry packet sent by the first network device; the telemetry packet is to detect quality of service of each path between the second network device and the first network device;

a first determining unit, to determine, according to information carried in the telemetry packet, the quality of service of each path.

In an example, the quality of service includes time delay and jitter; the tail of the telemetry packet carries the timestamp of each network device of the path.

In an example, the apparatus further comprises:

a second receiving unit, to receive a request packet sent by the second network device; the request packet is to request a mapping rule for transmission packets between the second network device and the first network device;

a second determining unit, to determine the first mapping rule according to the request packet.

In an example, the request packet carries target transmission parameters;

the second determining unit is specifically to determine, according to the quality of service of each path between the first network device and the second network device, that the quality of service satisfies the first mapping rule of the target transmission parameters.

In the technical solution provided by the examples of the present disclosure, the first network device buffers the received packet for the preset time duration, within the preset time duration, the first network device may receive other packets that belong to the same flow as the received packet. In this way, when the received packet is buffered for a preset time duration, when the first network device forwards the received packet, the jitter caused by the packet forwarding of the same flow may be reduced, and deterministic transmission may be realized. It may be seen that, in the technical solution provided by the examples of the present disclosure, the deterministic transmission may be realized by buffering the packet by the network device on a receiving packet side. The deterministic transmission method has no requirements for other network devices on the transmission path. This enables the technical solution provided by the examples of the present disclosure to better adapt to complex WAN, and improves the adaptability of the deterministic transmission to the WAN.

Figure 17:
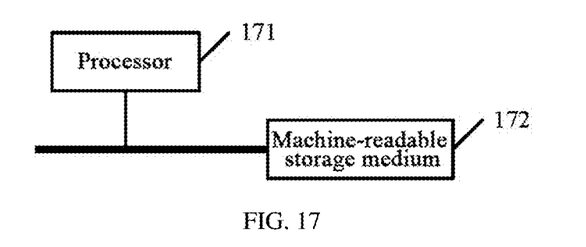
FIG. 17 is a structural diagram of a network device according to an example of the present disclosure.

Corresponding to the above-mentioned packet transmission method, an example of the present disclosure also provides a network device, as shown in FIG. 17, including a processor 171 and a machine-readable storage medium 172, where the machine-readable storage medium 172 stores machine-executable instructions that may be executed by the processor 171, and the processor 171 is caused by the machine executable instructions to implement any of the blocks of the packet transmission method applied to the first network device.

Figure 18:
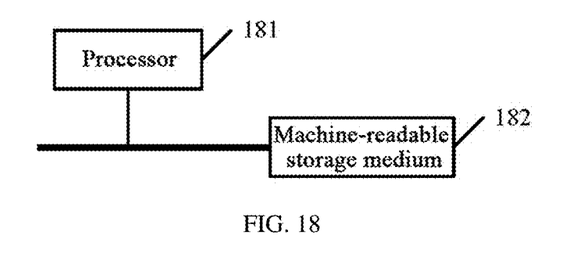
FIG. 18 is a structural diagram of a controller according to an example of the present disclosure.

Corresponding to the above-mentioned packet transmission method, an example of the present disclosure also provides a network device, as shown in FIG. 18, including a processor 181 and a machine-readable storage medium 182, where the machine-readable storage medium 182 stores machine-executable instructions that may be executed by the processor 181, and the processor 181 is caused by the machine executable instructions to implement any of the blocks of the packet transmission method applied to the controller.

The machine-readable storage medium may include a random access memory (RAM), or may include a non-volatile memory (NVM), for example at least one disk memory. In an example, the machine-readable storage medium may also be at least one storage device located away from the processor described above.

The aforementioned processor may be a general-purpose processor, such as a central processing unit (CPU), a network processor (NP), or the like; it may also be a digital signal processor (DSP), an disclosure specific integrated circuit (ASIC), a field-programmable gate array (FPGA) or other programmable logic device, a discrete gate or transistor logic device, a discrete hardware component.

In yet another example provided by the present disclosure, a computer-readable storage medium is also provided. The computer-readable storage medium stores a computer program, and the computer program implements any of the above-mentioned blocks of the packet transmission method applied to the first network device or any of the above-mentioned blocks of the packet transmission method applied to the controller when executed by a processor.

In yet another example provided by the present disclosure, a computer program is also provided, which when running on a computer, causes the computer to implement any of the above-mentioned blocks of the packet transmission method applied to the first network device, or any of the above-mentioned blocks of the packet transmission method applied to the controller.

In the aforementioned examples, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the examples of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the examples are described in corresponding ways, same or similar parts in each of the examples may be referred to one another, and the parts emphasized are differences to other examples. In particular, for examples of the apparatus, network device, controller, computer readable storage medium, and computer program, since they are substantially similar to the examples of the method, their description is relatively simple, and for the related aspects, one only needs to refer to portions of the description of the examples of the method.

The examples described above are merely preferred examples of the present disclosure, and not intended to limit the scope of the present disclosure. Any modifications, equivalents, improvements or the like within the spirit and principle of the disclosure should be included in the scope of the disclosure.

What is claimed is:

1. A packet transmission method applied to a first network device, wherein the method is applied to a wide area network (WAN), and comprises:
    receiving a packet sent by a second network device;
        forwarding, after buffering the received packet for a preset time duration, the received packet,
        wherein the method further comprises:
        reorganizing received packets, and
        arranging, after reorganization, packets belonging to a same flow in order,
        wherein, the reorganizing the received packets comprises:
        reorganizing, according to a first mapping rule, the received packets, and
        wherein the first mapping rule comprises a scheduling cycle, the scheduling cycle is to indicate a time period for packet forwarding;

the forwarding, after buffering the received packet for said preset time duration, the received packet comprises:
forwarding, after the scheduling cycle of the received packet expires and after buffering the received packet for said preset time duration, the received packet.

2. The method of claim 1, wherein the first mapping rule comprises a scheduling queue; the scheduling queue is to buffer packets of the same flow; or
wherein the first mapping rule comprises the preset time duration.

3. The method of claim 1, wherein, for a same flow, a time difference between a scheduling cycle of the first network device and a scheduling cycle of the second network device is greater than or equal to a target time delay, and the target time delay is a time delay between the first network device and the second network device.

4. The method of claim 1, wherein, the first mapping rule is carried in a header of the packet.

5. The method of claim 1, wherein, a quintuple is carried in a header of the packet, and the quintuple is to determine a flow to which the packet belongs; or,
a flow identity is carried in the header of the packet, and the flow identity is to determine a flow to which the packet belongs.

6. The method of claim 1, wherein, the first network device and the second network device have a same scheduling frequency, and the scheduling frequency is a frequency with which scheduling cycles are divided.

7. The method of claim 1, further comprising:
receiving a telemetry packet sent by the second network device; the telemetry packet is to detect quality of service of each path between the second network device and the first network device;
sending the telemetry packet to a controller.

8. The method of claim 7, wherein the quality of service comprises time delay and jitter;
a tail of the telemetry packet carries a timestamp of each network device in the path.

9. A packet transmission method applied to a controller, wherein the method is applied to a wide area network (WAN), and comprises:
sending a first mapping rule to a first network device; the first mapping rule is to indicate the first network device to buffer a packet sent by a second network device for a preset time duration, and then forward the received packet,
wherein the first mapping rule is further to indicate the first network device to reorganize received packets, and arrange, after reorganization, packets belonging to a same flow in order,
wherein the first mapping rule comprises a scheduling cycle, the scheduling cycle is to indicate a time period for packet forwarding, and
wherein the first mapping rule is further to indicate the first network device to forward, after the scheduling cycle of the received packet expires and after buffering the received packet for said preset time duration, the received packet.

10. The method of claim 9, further comprising:
sending a second mapping rule to a second network device;
the first mapping rule and the second mapping rule include a scheduling cycle; the scheduling cycle is to indicate a time period for packet forwarding;
for a same flow, a time difference between a scheduling cycle of the first network device and a scheduling cycle of the second network device is greater than or equal to a target time delay, and the target time delay is a time delay between the first network device and the second network device.

11. The method of claim 9, further comprising:
receiving a telemetry packet sent by the first network device; the telemetry packet is to detect quality of service of each path between the second network device and the first network device;
determining, according to information carried in the telemetry packet, the quality of service of each path.

12. The method of claim 9, wherein the quality of service includes time delay and jitter; a tail of the telemetry packet carries a timestamp of each network device in the path.

13. The method of claim 9, wherein before sending the first mapping rule to the first network device, the method further comprises:
receiving a request packet sent by the second network device; the request packet is to request a mapping rule for transmission packets between the second network device and the first network device;
determining the first mapping rule according to the request packet.

14. The method of claim 13, wherein the request packet carries target transmission parameters;
determining the first mapping rule according to the request packet comprises:
determining, according to the quality of service of each path between the first network device and the second network device, a path whose quality of service meets the target transmission parameters and the first mapping rule.

15. A network device, comprising a processor and a machine-readable storage medium, where the machine-readable storage medium stores machine-executable instructions that can be executed by the processor, and the processor is caused by the machine executable instructions to implement the method of claim 1.

16. A controller, comprising a processor and a machine-readable storage medium, where the machine-readable storage medium stores machine-executable instructions that can be executed by the processor, and the processor is caused by the machine executable instructions to implement the method of claim 9.

17. A non-transitory computer readable storage medium, wherein the computer readable storage medium stores instructions thereon which, when executed by a processor, cause the processor to implement the method of claim 1.

* * * * *